UNITED STATES PATENT OFFICE.

MARK C. RICH, OF BELLEFOURCHE, SOUTH DAKOTA, ASSIGNOR, BY MESNE ASSIGNMENTS, TO THE AMERICAN ALFALFA PRODUCTS CO., OF DENVER, COLORADO, A CORPORATION OF COLORADO.

ALFALFA PRODUCT.

1,195,153.  Specification of Letters Patent.  Patented Aug. 15, 1916.

No Drawing.  Application filed May 15, 1915.  Serial No. 28,269.

*To all whom it may concern:*

Be it known that I, MARK C. RICH, a resident of Bellefourche, in the county of Butte and State of South Dakota, have invented certain new and useful Improvements in Alfalfa Products, of which the following is a full, clear, and exact description.

The invention relates to the manufacture of alfalfa food products for human consumption.

Alfalfa is a lanuginous leaf covered with very fine soft, woolly hair and, when it is young, the dried secretions cause impurities to adhere to the leaves.

In the practice of the invention set forth in Letters Patent No. 1,104,136, granted to me July 21, 1914, it has been found that the flavor and quality of the products can be improved by the removal of the fine, woolly hair on the leaves and the impurities which are caused to adhere thereto by the dried secretions of the plant, and that such removal will not lessen the medicinal properties or food values of the product.

The present invention designs to provide an improved alfalfa product adapted for use in the manufacture of human foods, such as flour, and in which the flavor and quality are improved by the elimination of the dried secretions, soft woolly hairs and impurities adhering to the leaves.

The invention consists in the improvements in the manufacture of alfalfa products hereinafter set forth and more particularly defined by claims at the conclusion hereof.

In the manufacture of alfalfa products, according to the present invention, the alfalfa is harvested or cut when it is approximately from 8 to 12 inches high and about 14 days old. In this condition the alfalfa is naturally free from woody or hard fiber, as compared with its condition when it is from 30 to 35 days old and from 20 to 24 inches high. The alfalfa is cut about four inches above the ground to leave four inches of stubble. As it is harvested, it is deposited in small bunches, of about a bushel each, on the stubble, where it is left for about 24 hours, and during that period air will circulate through the bunches and the alfalfa leaves will wilt and the stems will be partially dried, so that about one-half of the inherent moisture in the alfalfa will be removed. This treatment of alfalfa thus harvested sweetens the odor of, and partially cures, the alfalfa. Next, the alfalfa is gathered and placed in a vat or tank in which it is washed in warm water. In this washing, the alfalfa is agitated or rubbed sufficiently to thoroughly remove the soft woolly hairs on the leaves, the dried secretions and the impurities caused to adhere to the leaves by these secretions. In this washing operation the impurities settle on the bottom of the vat. After being washed, the alfalfa is rinsed with clean warm water.

It has been found in practice that when the alfalfa has been thus treated, the product will have an improved flavor and quality because much of the bitterness and the impurities and dried secretions have been eliminated. Next, the alfalfa is placed in loose layers or on racks in a steel constructed room and subjected to artificial heat of about 150° Fahrenheit, from about three to seven days. This treatment prevents bleaching and causes the alfalfa to retain its desirable flavor and to remain light green in color. The period in which the alfalfa is subjected to artificial heat is varied according to the amount of moisture in the alfalfa.

Alfalfa thus treated has been found to be especially well adapted for the manufacture of flour. In such manufacture, the washed alfalfa, after having been treated, is fed through a suitable cutting machine which cuts the alfalfa into pieces approximately from one-eighth to one-half inch in length. When thus cut, it is ground in a bur-mill such as is used to grind wheat for flour. The ground product is next bolted and then stored in sacks until it is to be used.

This product forms a flour which is adapted for use in making foods for human consumption, which is palatable and digestible, and in which the essential food values and medicinal properties of the alfalfa are retained and from which the impurities and constituents which render the product unpalatable have been eliminated.

The invention is not to be understood as restricted to the precise practice set forth herein, since it may be modified within the scope of the appended claims without departing from the spirit and scope of the invention.

Having thus described the invention, what I claim as new and desire to secure by Letters Patent is:

1. That improvement in the manufacture of alfalfa products for human consumption, which consists in cutting alfalfa before it has become woody and fibrous and then washing it.

2. That improvement in the manufacture of alfalfa products for human consumption, which consists in cutting alfalfa before it has become woody and fibrous, then washing it and then subjecting the alfalfa to artificial heat to prevent bleaching.

3. That improvement in the manufacture of alfalfa products for human consumption, which consists in cutting alfalfa before it has become woody and fibrous and then removing the woolly hair, dried secretions and adhering impurities therefrom.

4. That improvement in the manufacture of alfalfa products for human consumption, which consists in cutting alfalfa before it has become woody and fibrous, then removing the woolly hair, dried secretions and adhering impurities therefrom and then subjecting the alfalfa to artificial heat to prevent bleaching.

5. That improvement in the manufacture of alfalfa products for human consumption, which consists in cutting alfalfa before it has become woody and fibrous, then washing it and then grinding it into flour.

6. That improvement in the manufacture of alfalfa products for human consumption, which consists in cutting alfalfa before it has become woody and fibrous, then removing the dried secretions, woolly hairs and adhering impurities therefrom, and then grinding it into flour.

7. An alfalfa flour for human consumption, containing dried young washed alfalfa which is naturally free from woody fiber.

8. An alfalfa product for human consumption containing young alfalfa which is naturally free from woody fiber and from which the woolly hair, dried secretions and adhering impurities have been removed.

9. An alfalfa flour for human consumption, containing ground young alfalfa which is naturally free from woody fiber and from which the woolly hair, dried secretions and adhering impurities have been removed.

MARK C. RICH.

Witnesses:
FRED GERLACH,
KATHARINE GERLACH.